United States Patent Office 2,891,308
Patented June 23, 1959

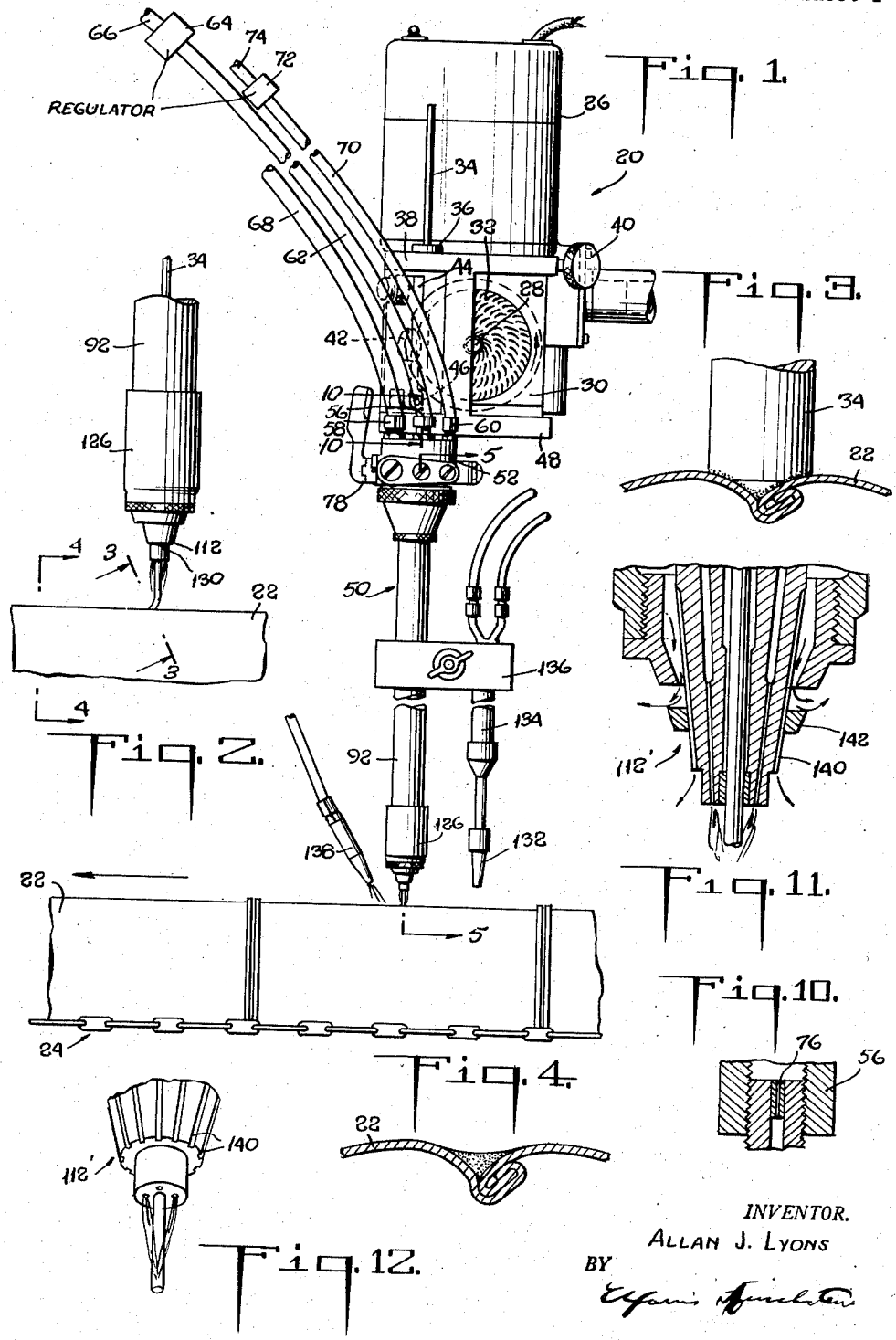

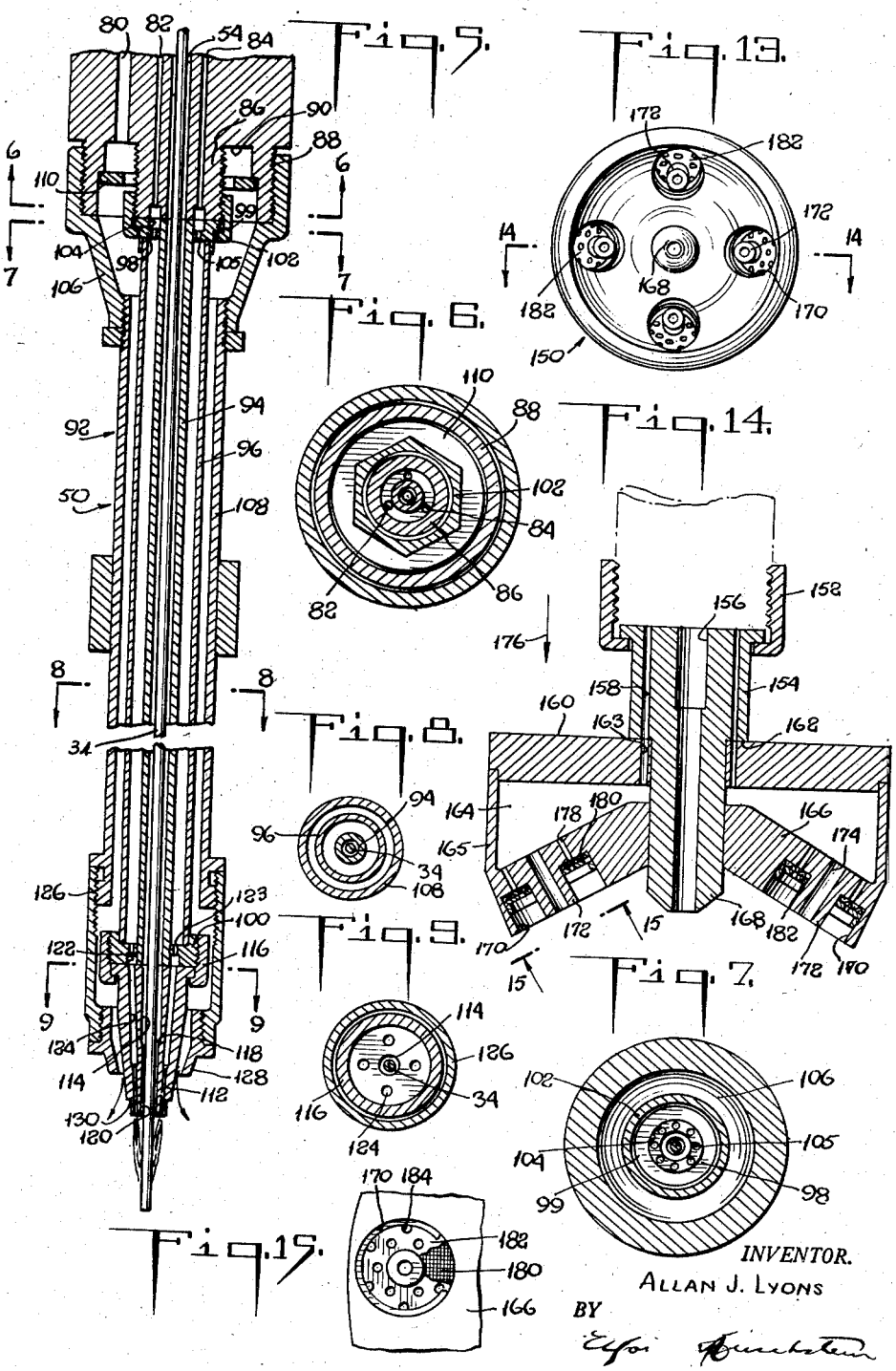

2,891,308

METHOD AND APPARATUS FOR APPLYING SOLDER

Allan J. Lyons, Chicago, Ill., assignor to Metallizing Company of America, Chicago, Ill., a partnership Application November 15, 1952, Serial No. 320,650

3 Claims. (Cl. 29—497)

This invention relates to a method and apparatus for applying solder. More specifically, my invention relates to a soldering gun and process for using the same.

At the present time commercial soldering is practiced by various methods. According to one system the solder is completely liquified in a bath and the molten solder is run through a conduit to the point of application. This system requires an appreciable amount of time to bring the solder bath up to temperature and necessitates keeping the line hot when there is no demand for solder. It also requires reheating the line if through some accident the heating apparatus is shut off during use.

Another system of solder application constitutes feeding solder wire against a preheated part to be soldered, for example, a can, and moving the can past the tip of the wire. However, to effectually carry out the second system excessive heat has had to be applied to the part to be soldered, often causing discoloration of such part. Also if the part was moving at a high production speed the soldering often skipped at the start of the seam. Furthermore, the solder in wire form effected a very poor physical contact with the work.

In a third system a bank of soldering iron is heated by burners playing on the sides of the irons. Solder in wire form is fed to a groove in one iron which melts the solder whereupon the solder flows down on to the work. The other irons are used to smooth out the solder on the work. The work usually is preheated by a bank of burners. This system smears the solder over an area equal to the width of the irons, requires interruption of the work shift for tinning of the irons, and leaves an unsightly seam.

Still another system involves using a soldering iron or blow torch and feeding the solder by hand to preheated work. Such system obviously is unfit for large scale production.

Also soldering irons have been used which are heated by an internal gas flame that is held in position on a preheated seam by an operator, the solder being fed against one of the flat surfaces of the iron. This method is subject to all the defects mentioned with respect to the third system.

It is an object of my invention to provide a new type of soldering gun and method for using the same which overcome the deficiencies of the systems hereinabove described.

More specifically, it is an object of my invention to provide a solder gun and process for its use wherein the solder is handled in solid form up to the point of application but is applied in semi-liquid form; wherein the part to be soldered need not be excessively heated, if it has to be heated at all; wherein the feed of solder can be stopped or started instantaneously without affecting the operation of the gun; wherein the gun can be readied for use from a cold condition in a short time without the necessity of heating a large mass of solder; wherein excellent contact is afforded between the non-molten solder and the work; wherein it is easy to ensure application of solder from one extreme end of a seam to the other; and wherein, if desired, very large amounts of solder can be applied quickly.

It is another object of my invention to provide a gun and process of the character described which are equally efficiently applicable to automatic and hand controlled operations.

It is another object of my invention to provide a gun and process of the character described which are extremely economical in the use of the solder.

It is another object of my invention to provide a gun and process of the character described which are usable with all types of solders—very soft solders to the hardest of solders including brazing materials.

It is another object of my invention to provide a gun and process of the character described which effect a good clean joint.

It is another object of my invention to provide a gun and process of the character described which are speedy and simple to use.

It is another object of my invention to provide a gun of the character described which constitutes relatively few and simple parts and is sturdy and dependable.

It is another object of my invention to provide a gun of the character described which can be manipulated with ease and confidence by comparatively unskilled labor.

Other objects of my invention will in part be obvious and in part will be pointed out hereinafter.

My invention accordingly consists in the features of construction, combinations of elements, arrangements of parts and series of steps which will be exemplified in the guns and processes hereinafter described and of which the scope of application will be indicated in the appended claims.

In the accompanying drawings in which are shown various possible embodiments of my invention, Fig. 1 is a front elevational view of a solder gun constructed in accordance with my invention, the same being illustrated in operation;

Fig. 2 is a view on an enlarged scale similar to Fig. 1 but showing only the tip of the gun and the adjacent part of the work;

Figs. 3 and 4 are enlarged sectional views taken substantially along the lines 3—3 and 4—4, respectively, of Fig. 2;

Fig. 5 is an enlarged sectional view taken substantially along the line 5—5 of Fig. 1;

Figs. 6, 7, 8 and 9 are sectional views taken substantially along the lines 6—6, 7—7, 8—8, and 9—9, respectively, of Fig. 5;

Fig. 10 is an enlarged sectional view taken substantially along the line 10—10 of Fig. 1, and illustrating the details of a gas-fuel reduction valve;

Fig. 11 is a highly enlarged vertical central sectional view through the tip of a gun embodying a modified form of my invention;

Fig. 12 is a perspective view of the tip of the gun shown in Fig. 11;

Fig. 13 is a bottom view of the tip of a gun nozzle embodying another form of my invention;

Fig. 14 is an enlarged sectional view taken substantially along the line 14—14 of Fig. 13; and Fig. 15 is an auxiliary view of an element of the tip shown in Fig. 13, the same being taken substantially along the line 15—15 of Fig. 14.

In general I carry out my invention by feeding solder in the form of a solid wire toward a point of application and heating the solder immediately adjacent said point of application, the heat being supplied in sufficient quantity to bring the solder substantially to its fusion temperature. For example, the heat thus supplied constitutes from about 75 to 100% of the heat required to raise the solder from room to fusion temperature and to fuse the same. Whether the heat furnished will be 100% of the heat necessary to fuse the cold solder depends upon the manner in which the solder is to be applied.

In most instances it is desirable to have the solder applied to the work by wiping, that is to say, to have a thin film of pasty, i.e. semi-fluid, solder wiped off the tip of the wire by the work as it moves past the wire, this application being excellent where it is desirable to have a narrow seam about the width of the wire. Such application is useful for instance for soldering the seam of a tin can. The solder both at the sides and the ends of the can can be controlled so that it will not flow beyond the desired width of the same and, thus, a minimum of solder is used. In these cases the additional heat required to fully fuse, i.e. melt the solder, is supplied by the work itself which, since it needs very little in the way of heat, does not have to be raised to high temperatures as previously was necessary. Heretofore objects to be soldered often have been heated to red heat or temperatures approaching the same in order that they might store sufficient heat to melt the solder wire as it touched the work. Under the system disclosed herein it will be appreciated that temperatures of this order no longer need be employed.

Under other conditions it sometimes is desirable to apply the solder in liquid form, i.e. in drops, and then the heat supplied to the wire as it is heated locally adjacent the point of application is 100% of the heat required to raise the solder from room to fusion temperature and to fuse the same.

In both cases the present apparatus has the advantage of conducting the solder to the point of application in solid and therefore easily handled form and yet of fusing the solder with extreme ease at the point of application inasmuch as between the point where the wire is fed and the point where the solder is supplied a heating means has been interposed to presoften or even completely fuse the wire. Thus the present invention has the advantage of both of the earlier methods, retaining the ease of handling inherent in the wire feeding apparatus and the ease of application inherent in the liquid soldering apparatus. However, the disadvantages of both previous methods no longer are present.

Referring now in detail to the drawings, and more particularly to Figs. 1-12, the reference numeral 20 denotes a soldering gun embodying the present invention, the same being shown as it is employed to apply solder by wiping to cans 22 moved past the gun by a conveyor belt 24.

The gun 20 has an electric motor 26 of standard design serving as a constant speed source of rotary power. Said motor drives a slow speed shaft 28 through a gear reduction 30 of any well known type. The shaft carries a knurled conical roller 32 which constitutes the driving element of a wire feed means.

The solder wire 34 is guided into the feed means by an entry bushing 36 securely fixed to a side plate 38. Suitable means, not shown in detail, is provided to mount the plate 38 for slidable movement parallel to an element of the conical roller 32.

Adjusting means including a manipulating knob 40 is provided to shift the plate 38 parallel to the length of said element of the roller 32. The plate 38 forms part of a frame on which a rotatable wire engaging roller 42 is carried by a lever 44 pivotally mounted on the frame, as at 46, whereby the distance between the rollers 32, 42 readily may be adjusted.

The solder wire 34 travels from the entry bushing 38 to between the rollers 32, 42 whereby when the roller 32 is driven by the motor 26 the wire will be fed at a speed which is the function of the position of the wire engaging roller 42 on the conical roller. This position can be adjusted by turning the knob 40.

The wire leaves feed means through an exit bushing (not shown) which is mounted on a plate 48 integral with and parallel to the plate 38.

The plate 48 supports a solder nozzle 50. Adjacent said plate the nozzle includes a manifold block 52 into which the various necessary gases are introduced. The center of the block is formed with a passageway 54 to guide the still cold solder wire 34 leaving the feed means. The block includes three entry nipples 56, 58, 60, respectively adapted to be connected to a source of combustible gas, e.g. acetylene, a source of a gaseous cooling medium such as air, and a source of a combustion-supporting gaseous medium, for example, oxygen.

The gas nipple 56 is connected by a flexible conduit 62 to a gas regulator 64 which in turn is connected by a conduit 66 to a source of combustible gas under pressure. This arrangement is employed in connection with the gun shown inasmuch as the gas under pressure in the particular application illustrated is at a high pressure, e.g. 300 to 2000 pounds per square inch, in a stored container and leaves the container through a reduction valve which only lowers the pressure to about ten pounds per square inch. The regulator further reduces the pressure to about four pounds per square inch and will maintain the pressure comparatively uniform at this figure.

The nipple 58 for admitting a cooling gas is connected to a flexible conduit 68 which runs, for example, to a low pressure air pump. It will be understood that, if desired, an inert gas, such for instance as nitrogen, can be used for the cooling medium.

The nipple 60 is connected by a flexible conduit 70 to a regulator 72 which is connected by a conduit 74 to a source of oxygen, e.g. an oxygen tank. The regulator is employed to reduce the oxygen pressure to about thirty-five pounds per square inch. Each of the nipples 56, 60 includes a reducing orifice 76 (see Fig. 10) which further reduces the pressure of the combustion gas and oxygen. In the example illustrated, which it is to be understood is not limitative but merely exemplary, the pressure of the combustion gas is reduced to three ounces and of the oxygen to two pounds.

The flow of all the gases is simultaneously regulated by a valve 78 having separate simultaneously operated control passageways for each of the three gases.

After traversing the valve the cooling medium enters a bore 80 in the manifold block and the combustion gas and oxygen enter bores 82 and 84, respectively. Each of these bores terminates on the lower face of the manifold block. This face of the block is formed with a central boss 86 in which the bores 82, 84 are located. Said face of the block also includes a raised annular ridge 88 which in conjunction with the boss 86 defines an annular well 90 at whose base the bore 80 is disposed. The outer side of said ridge and the side of the boss 86 are formed with male threads.

Quite frequently in the use of the gun it is necessary, due to lack of available space around the zone of operation, to have the wire feeding means remote from said zone, and to this end the nozzle 50 may include an extension 92. It will be apparent as the description proceeds that this extension may be eliminated and the operative tip of the nozzle directly connected by a means which shortly will be described to the manifold block 52.

The extension includes an inner tube 94 (Fig. 5) and an outer tube 96 the ends whereof are integrally connected by apertured plugs 98, 100. The plug 98 at the manifold end of the extension protrudes a short distance beyond the outer tube 96 to form a flange 99 which is engaged by a coupling nut 102 internally threaded to engage the threaded boss 86 whereby to detachably secure an end of the extension to the manifold block. The other plug 100 is formed with a male thread whose purpose soon will be apparent. The inner tube 94 is concentric with and of the same internal diameter as the wire guiding passageway 54 and thereby constitutes an extension of said passageway. The plug 98 is formed with an annular groove 104 around the inner tube 94, this groove being in registry with the bores 82, 84 and forming with the boss 86 a plenum chamber in which the combustion gas and oxygen are mixed and from which they pass through apertures 105 in the plug to the annular space between the inner and outer tubes 94, 96.

The nozzle further includes a reduction bushing 106 formed with internal threads at opposite ends. The threads at the larger end of the bushing engage the threaded ridge 88 and the threads at the smaller end of the bushing engage the threaded end of a pipe 108 which forms part of the extension 92 and is concentric with the tubes 94, 96. The pipe 108 encircles the outer tube 96 and thereby forms an annular space through which the cooling medium emerging from the bore 80 and passing through the bushing will be led to the zone of soldering action.

Optionally a diffusing washer 110 may be located within the bushing.

The working tip of the soldering nozzle principally constitutes a vent 112 in the form of a frusto-conical piece having a central passageway 114 for guiding the solder wire. The back of the vent is outwardly flanged to form an abutment for a coupling 116 which is internally threaded to engage the threads on the plug 100 and thereby secure the vent to the extension. If the extension is not employed the vent can be coupled directly to the boss 86 whose external diameter is the same as that of the plug 100. The passageway 114 is reduced intermediate its length, as at 118, to more closely accommodate and thus better control the solder wire. Moreover, the very tip of the vent has set therein a hardened steel sleeve 120 which affords a close sliding fit with the wire as it emerges from the nozzle and thereby substantially prevents any lateral movement thereof. It may be observed that the wire up to its point of exit from the vent is cool and, therefore, as solid as it can be at the ambient temperature.

The rear face of the vent abuts against the lower face of the plug 100, said face of the plug being recessed to provide an annular groove 122 functioning as a distributing manifold for the mixture of combustion gas and oxygen discharged through holes 123 in the plug 100.

A series of passageways 124 communicating at one end with the groove 122 open at their other ends at the exposed tip of the vent. Said passageways converge toward the tip of the vent whereby the stream of gases issuing from the vent will meet at a point. The angle of convergence and the spacing of the passageways 124 is such that they converge at a point shortly below the vent, e.g. one-half inch, and in the path of travel of the wire 34.

Inasmuch as the gases issuing from the passageways are a combustible mixture they will when ignited play a flame on the wire a short distance from the vent and immediately after the wire has emerged from the nozzle 50. Accordingly, as long as the wire is within the nozzle it is as hard and rigid as it normally would be at room temperature and, accordingly, can be handled with ease by conventional wire handling equipment. However, as soon as the wire issues from the nozzle it is presoftened preparatory to soldering, the extent of presoftening being a function of the setting of the valve 78. As indicated earlier, the presoftening merely may heat up the wire to a temperature which requires further heating for fusion or the presoftening actually may cause the wire to become partly or fully liquified as it passes through the flame. It will be understood, of course, that the rate of feed of the wire, which is adjustable by manipulating the knob 40, is a factor in setting the valve 78 inasmuch as the faster the wire is fed the more heat must be supplied to carry out any predetermined degree of presoftening, be it preheating or semi-plasticizing or liquifying.

In accordance with a feature of my invention the nozzle is kept cool so that the wire may stay cool during its passage through the gun. For this purpose I thread a collar 126 on a male thread formed at the lower end of the pipe 108. The forward end of the collar is internally threaded to receive a shield 128 which directs an annular stream of air around the vent adjacent its free end. It will be observed that the shield terminates short of the tip of the vent whereby to permit air to expand outwardly away from the vent. This prevents the air from enveloping the flame fully and also prevents the air from playing with too great a force upon freshly deposited liquid solder. However, sufficient air passes over the vent up to its tip to maintain the same cool despite the presence of the flame. Further to assist in keeping air away from the flame, the vent is provided with a step 130 in back of its tip. This will tend to disturb smooth flow of air along the vent and create eddy currents which dissipate the speed of air flow down the vent in contact with the surface thereof.

It may be mentioned that, in the event the extension is omitted, the bushing 106 will serve in substantially the same fashion as the air shield 128.

It is desirable to employ in conjunction with the gun a suitable preheater, and optionally, an after-heater. As illustrated herein the preheater includes a flame tip 132, the feed tube 134 whereof is held in place by a clamp 136 secured to the nozzle 50. The flame tip is fed from a suitable source of combustible gas and oxygen. The flame issuing from said tip plays on the work, e.g. the cans 22, a short distance from the point of application of the solder. The preheat tip 132 is adjusted to preheat the surface of the work in the soldering region to a temperature which is a function of the type of solder used and the temperature to which the solder wire is preheated in the gun. Thus, if a soft solder is employed the preheat temperature will be lower than with a hard solder. Likewise if the solder is presoftened to the temperature of fusion the preheat temperature need not be as high as if the solder is simply presoftened but remains solid. In general the heat supplied to the solder by the preheated work simply is sufficient to fuse the heated solder.

For the after-heater I may employ a flame tip 138. The flame issuing from this latter tip plays upon the work shortly after it leaves the region of operation of the solder gun. The after-heater helps in making the solder flow more easily and thereby insures better and evener distribution. It also is desirable to employ an after-heater on frail work where preheating to too high a temperature would deleteriously affect the work. When the flame issuing from the vent 112 only is used to preheat the solder wire for presoftening or semi-plasticizing the same but not fully liquifying it, the solder will remain in solid form right to its tip, although almost at the temperature of liquification. However, the skin of the solder wire will be warmer than the body thereof so that if it is substantially at the temperature of the fusion a thin liquid skin will cover the tip of the solder, this being indicated by the fine dots at the tip of the wire in Fig. 3. When this skin is brushed by the work it will be wiped off and immediately be replaced by freshly formed liquid skin fused in the heat of the flame. Moreover preheating the work will tend to aid the skin in lowering its viscosity and thereby increase the speed with which the fused solder flows away from the point of contact with the work. This flow of the liquified solder also is indicated by the fine dots in Fig. 3. The temperature of the flame is adjusted, as mentioned hereinbefore, in accordance with the rate of speed of the feed of the wire and the temperature to which the work is preheated in such fashion that the wire is presoftened and semi-plasticized as fast as it is fed to the work.

If for some reason the work is stopped, the motor 26 is deenergized thereby preventing any further feed of the wire which will be cut off by the flame. However, the flame need not be shut off and the solder gun therefore remains ready immediately to restart as soon as the work begins to move. Likewise on a fresh start at the beginning of a shift the gun is ready for immediate operation inasmuch as it is not necessary to preheat a large mass of solder.

In Figs. 11 and 12 I have illustrated a modified form of vent 112' for the solder gun 20. The modified vent is essentially similar to the vent 112 so that like parts will be referred to by the same numerals primed. The vent 112' differs from the vent 112 in that, instead of employing a smooth frusto-conical outer surface, channels 140 are formed on said outer surface extending longitudinally of the vent. This encourages the flow of a small quantity of air down the vent and around the flame where it furnishes additional air for combustion thereby increasing the efficiency of use of combustible gases. However, to make certain that this additional flow of combustion air is not excessive and that too much air is not allowed to flow around the flame and thereby encourage oxidation of the freshly deposited solder, I provide a deflecting ring 142 on the vent below the air shield 128'.

In Figs. 13 to 15 I have shown another form of nozzle 150 which has been found to be highly useful in practice. To employ this nozzle the collar 126 is unscrewed from the forward end of the pipe 108 and the coupling 116 is unscrewed from the plug 100.

The nozzle 150 includes a coupling 152 which is screwed on said plug 100. The coupling secures to the plug the rear end of a rod 154 having a central opening 156 for passage of the solder wire 34, said opening being aligned with the internal diameter of the tube 94. The rod 154 further includes a plurality of bores 158 opening on the rear face of the rod to the distribution manifold 122, whereby a combustible gas and air will flow through said bores.

A disk 160 carried on the rod 154 intermediate its ends is seated against a shoulder 162 on the rod. The bores 158 are registered with bores 163 in the disk, these latter bores terminating on the lower face of said disk. The disk constitutes one wall of a plenum chamber 164 whose side walls are formed by a sleeve 165. The face of the chamber opposite the disk consists of a conical element 166 which is centrally apertured to pass a reduced portion 168 of the rod 154. Thus the wire is led by the opening 156 past the plenum chamber 162 and exits at the center of the conical element 166. The apex of said conical element is located in back of the tip of the rod.

The lower surface of the conical element is formed with a plurality of depressions 170 having central raised bosses 172. Said depressions are equiangularly spaced and are equidistantly located from the rod 154. Each boss is pierced by an axial through-hole 174 which provides a passageway for the mixed combustible gas and combustion gas in the plenum chamber so that during use of the nozzle flames will issue from the bosses 172. All of these flames converge upon a single zone of the solder wire where they will presoften or semi-plasticize or liquify said wire (depending upon rate of feed of the wire and rate of feed of the gases) in the same manner as the flame issuing from the vent 122. Cooling air for the nozzle will issue from the annular space between the outer tube 96 and the pipe 108, the direction of such air being indicated by the arrow 176.

Any desired plural number of bosses 172 can be employed although I prefer to use three or more, best results having been obtained with six.

The nozzle 150 is particularly well adapted to be used with city or natural gas, air being employed as the source of oxygen, that is to say, the mixture that flows through the bores 158 consists of a properly proportioned combination of city or natural gas and air. Although the flame created by this mixture theoretically is self-supporting, I have found in practice that it tends to quench. To avoid the necessity of relighting the flames, possibility of an explosion of a mixture of gas and air around the nozzle, and interruption of the soldering action, I employ a pilot flame immediately adjacent each boss 172. The pilot flame is produced within the depressions 170 which are included for such purpose. The base of each depression is connected to the plenum chamber 162 by a plurality of tiny passageways 178. Moreover, the base of each recess is covered by a wire mesh screen 180 which prevents flashback of the pilot flame. The screen 180 is overlain by a disk 182 having a plurality of apertures 184 through which the gas-air flame issues. Said flame plays around the tip of the boss 172 and immediately relights any one of the principal flames which may have been extinguished.

It thus will be seen that I have provided guns and processes which achieve all the objects of my invention and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described my invention, I claim as new and desire to secure by Letters Patent:

1. A solder gun comprising an elongated member having an axial bore providing a passageway for guiding solder wire, means associated with said member for steadily feeding solder wire through said passageway at a selectively variable constant speed, said passageway having a terminal end at one end of said member, said member having a plurality of bores around said passageway, the axes of said plurality of bores converging to a point along the longitudinal axis of said passageway beyond the terminal end of said passageway, means to lead a mixture of a combustible and a combustion gas to said plurality of bores whereby to play a flame on the solder wire after it has emerged from the passageway so as to heat the wire around its entire periphery, means to regulate the rate of feed of said mixture so that the solder wire has supplied thereto at least seventy-five percent of the heat required to raise the temperature of the wire to fusion and to fuse the same, said regulating means thereby causing the flame to heat the solder wire short of fusion, and means associated with said member to direct a ring of a gaseous cooling medium on the external surface of said member adjacent the terminal end of said passageway and in a direction having a substantial component in the direction of movement of the solder wire through the passageway, the external surface of said member adjacent said terminal end being so configured as to flow said gaseous medium down said surface to and past the end of said member containing the terminal end of said passageway.

2. A solder gun as set forth in claim 1 wherein a shield is provided attached to and surrounding the member adjacent the terminal end of the passageway, the means playing a cooling gaseous medium on the member directing said medium onto the external surface of the member behind the shield, said shield including through openings approximately parallel to the plurality of bores to guide a portion of the cooling medium along the external surface of the member beyond the shield.

3. A method of soldering comprising preheating work to a temperature higher than the fusion point of a solder wire, causing transverse relative movement between said preheated work and a solder tube, feeding the solder wire steadily at a selectively variable constant speed through the tube and toward the path of travel of the preheated work, providing a space between the delivery end of the tube and the path of travel of the work whereby the tip of the solder leaving the tube and moving toward the work is unconfined, and heating the unconfined solder in said space to a temperature short of fusion and to supply at least seventy-five percent of the heat required to raise the temperature of the wire to fusion whereby the heated but unfused wire upon brushing against the preheated work will be raised to the temperature of fusion so as to melt and be deposited upon the work.

References Cited in the file of this patent

UNITED STATES PATENTS

| | | |
|---|---|---|
| 340,148 | Norton et al. | Apr. 20, 1886 |
| 352,034 | Brooks | Nov. 2, 1886 |
| 935,684 | Peterson et al. | Oct. 5, 1909 |
| 993,195 | Phelps | May 23, 1911 |
| 1,475,189 | Krebs | Nov. 27, 1923 |
| 1,662,115 | Johnson | Mar. 13, 1928 |
| 1,925,656 | Duitz | Sept. 5, 1933 |
| 1,994,700 | Halbing et al. | Mar. 19, 1935 |
| 2,065,467 | Hutchison | Dec. 22, 1936 |
| 2,089,029 | Jones | Aug. 3, 1937 |
| 2,181,135 | Kehl | Nov. 28, 1939 |
| 2,260,342 | Scott | Oct. 28, 1941 |
| 2,295,701 | Wagner | Sept. 15, 1942 |
| 2,431,781 | Wagner | Dec. 2, 1947 |